METHOD AND MEANS FOR IDENTIFYING WIRE-PAIRS

Filed Aug. 31, 1956 4 Sheets-Sheet 1

Inventor
William James Meanley
By Robert B. Harmon
Attorney

Sept. 17, 1957 W. J. MEANLEY 2,806,995

METHOD AND MEANS FOR IDENTIFYING WIRE-PAIRS

Filed Aug. 31, 1956 4 Sheets-Sheet 2

Inventor
William James Meanley
By Robert B. Harmon
Attorney

Sept. 17, 1957 W. J. MEANLEY 2,806,995

METHOD AND MEANS FOR IDENTIFYING WIRE-PAIRS

Filed Aug. 31, 1956 4 Sheets-Sheet 3

Inventor
William James Meanley
By Robert B. Harmon
Attorney

METHOD AND MEANS FOR IDENTIFYING WIRE-PAIRS

Filed Aug. 31, 1956 4 Sheets-Sheet 4

Inventor
William James Meanley
By
Attorney 2,806,995

METHOD AND MEANS FOR IDENTIFYING WIRE-PAIRS

William James Meanley, North Bay, Ontario, Canada, assignor to Bell Telephone Company of Canada, Montreal, Quebec, Canada, a corporation of Canada Application August 31, 1956, Serial No. 607,373

4 Claims. (Cl. 324—66)

This invention relates to a system for identifying conductors and more particularly to the method of and the apparatus for locating, at the remote extremity of a cable, pairs of conductors, in a cable composed of a plurality of such pairs, and ascertaining the identity of their numerical relation with each other at the other extremity of the cable.

Cables employed for communication purposes, composed of a plurality of pairs of conductors arranged in a predetermined numerical order, are in common use. In assembling these cables with the equipment with which they are to be employed, it is the common practice to connect the individual conductors in a predetermined sequence to terminals assembled on a distributing frame disposed in a telephone exchange and to identify the individual cable pair at the remote end of the cable by the attendant thereat ascertaining the pair in which a signal tone has been impressed by the frame attendant at the telephone exchange, the numerical relation between pairs being determined by instructions given between the attendants over a control pair in the cable.

It is an object of this invention to provide the method of and the apparatus for locating, at the remote extremity of a cable, individual pairs of conductors in a cable composed of a plurality of pairs of such conductors, and ascertaining their numerical relation with each other at the other extremity of the cable in the most economic manner.

It is a further object of this invention to provide the method of and the apparatus for locating, at the remote extremity of a cable, individual pairs of conductors in a cable composed of a plurality of pairs of conductors, and ascertaining their numerical relation with each other at the other extremity of the cable with the foregoing characteristics, and in which the operation is carried out with a maximum reliability.

A still further object of this invention is to provide the method of and the apparatus for locating, at the remote extremity of a cable, individual pairs of conductors in a cable composed of a plurality of such conductors and ascertaining their numerical relation with each other at the other extremity of the cable with the foregoing characteristics, and in which the operation is carried out in a minimum of time.

Another object of this invention is to provide the method of and the apparatus for locating, at the remote extremity of a cable, individual pairs of conductors in a cable composed of a plurality of such conductors and their numerical relation with each other at the other extremity of the cable with the foregoing characteristics in which the condition of the pairs is ascertained before the identifying operation is carried out.

These and other objects of this invention are obtained by providing a system, controlled by an attendant at the remote extremity of a cable, which includes, at the other extremity of the cable, a two directional automatic telephone connector switch the wipers of which make successive individual contact step by step with a predetermined number of contacts on the terminal bank thereof during the rotary movement of the wipers without their return to their normal position between each step, and providing means, at the remote end of the cable, consisting of a control set having means to control the step by step movement of the connector switch over a completed circuit formed with a control conductor pair associated with the switch and to apply a signal tone from a source associated with the connector switch, successively, to the conductors, individually and in pairs, to each conductor pair, after ascertaining if the conductor pair under test was being utilized, by altering the switching conditions of the completed circuit.

These and other objects of the invention may be obtained by referring to the following description, taken in conjunction with the accompanying drawings, in which like numbers refer to like parts, in which.

Figure 1:
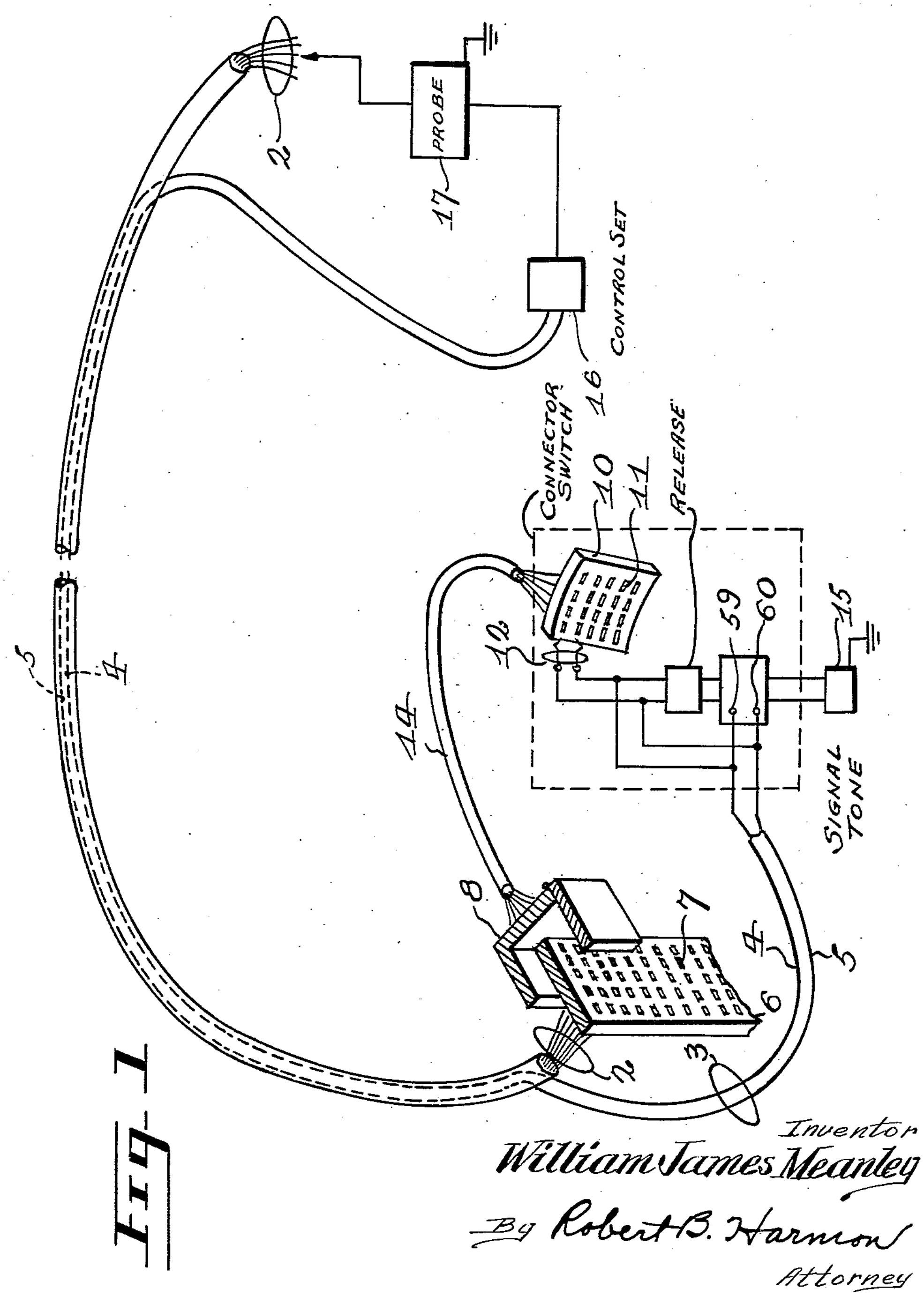
Fig. 1 illustrates a diagrammatic view of the system in which the invention is incorporated.

There is shown in Fig. 1 a cable 1, which includes a plurality of insulated conductors 2, shown as a group, with a control pair 3 selected therefrom, consisting of conductors 4 and 5 and, at the telephone exchange, main distributing frame 6 equipped with contacts 7, connecting shoe 8, automatic connector switch 9 having bank 10, contacts 11, connecting wipers 12, actuating mechanism 13 and terminals 59, 60 to which one end of control pair 3 is connected, shoe 8 being connected to contacts 11 of bank 10 by multi-conductor cable 14 in the same predetermined numerical sequence, signal tone device 15, and, at the location where the remote end of cable 1 is to be terminated, there is shown control set 16, probe 17.

The signal tone device 15, and probe 17 may be of any suitable conventional type while the connector switch 9 is a two-directional switch, as employed in automatic telephony, in which a pair of wipers 12 traverses a series of contacts 11 in continuous succession before returning to its original position. Such a connector switch is generally known as a test connector in the step-by-step telephony art.

Figure 2:
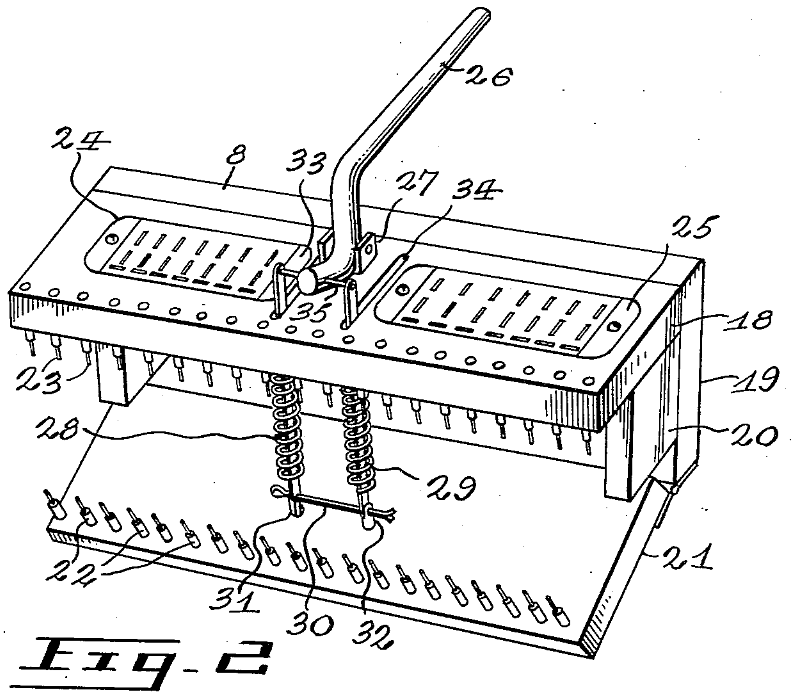
Fig. 2 illustrates a perspective view of the connecting shoe employed in the invention.
Figure 3:
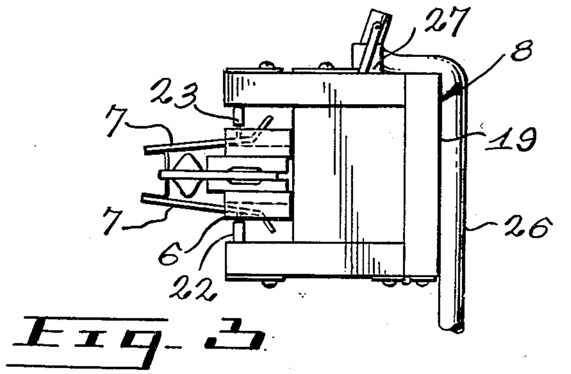
Fig. 3 illustrates a fragmentary view in end elevation of the shoe illustrated in Fig. 2, assembled with a portion of the contacts of the distributing frame to which the cable to be tested is connected.

There is shown in Figs. 2 and 3, the construction of and its association with the frame 6, the connecting shoe 8 which consists of enclosing elements 18, 19, 20, 21, element 21 being hinged to element 19, element 21 having assembled thereon plunger contacts 22, element 18 being equipped with plunger contacts 23, connecting sockets 24, 25, and offset lever 26 movable on brackets 27. Assembled on the element 21 are the springs 28, 29, one end of the springs 28, 29 being movable by virtue of shaft 30 with brackets 31, 32, the remote end of springs 28, 29 projecting through slots 33, 34 and movable by virtue of lever 26 and shaft 35. Plunger contacts 22 and 23 are wired to the sockets 24 and 25 in a predetermined numeral sequence, the contacts 11 on bank 10, Fig. 1, also being arranged in this sequence when connected to the sockets 24 and 25 by cable 14.

Figure 4:
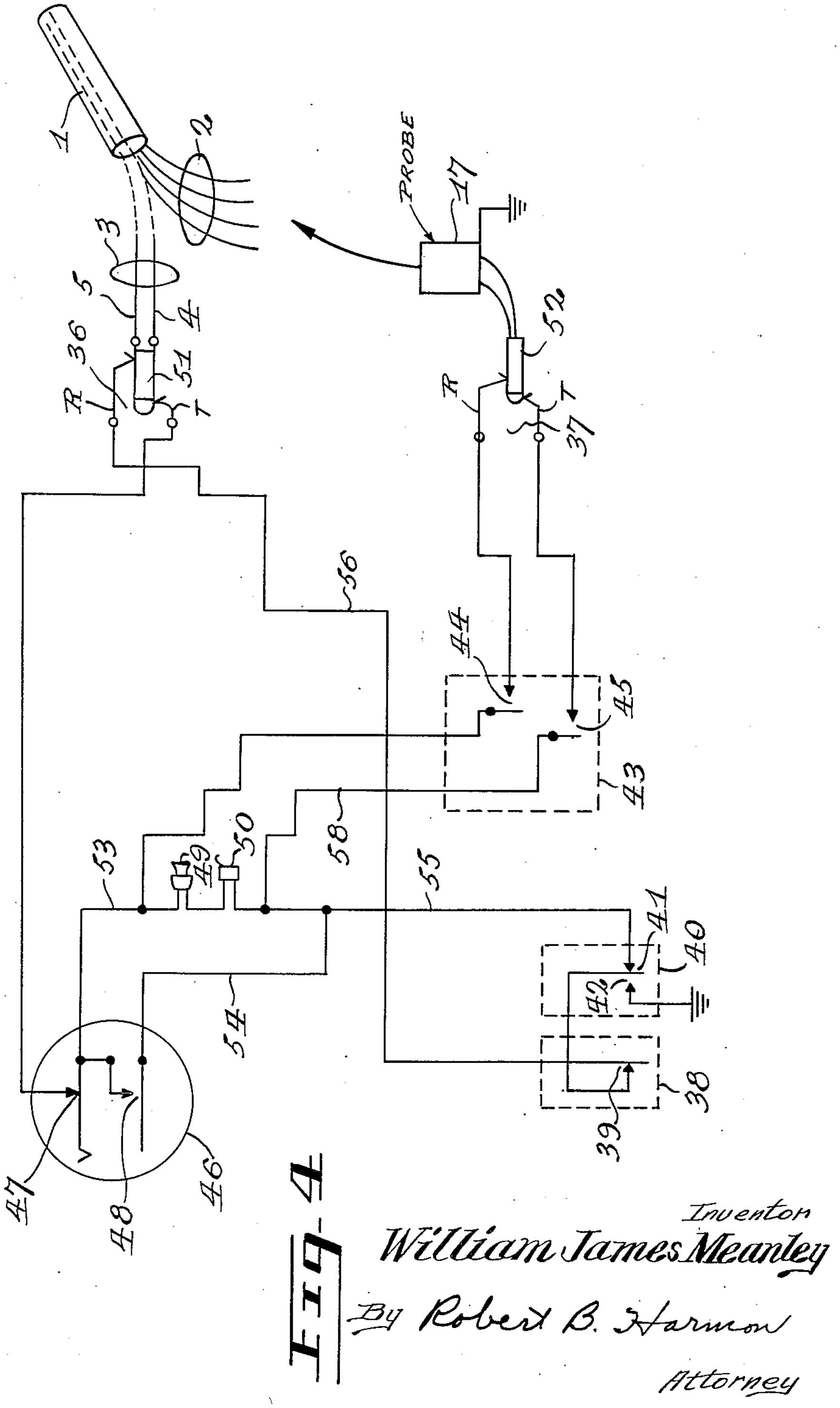
Fig. 4 illustrates the schematic circuit diagram of the control set disposed at the remote end of the cable.

In Fig. 4 there is shown the schematic circuit diagram of the control set 16 consisting of jacks 36, 37, key 38 having contact 39, key 40 having contacts 41, 42, key 43 having contacts 44, 45, dial 46 having contacts 47, 48, telephone transmitter and receiver 49, 50, respectively, plugs 51, 52, conductors 53, 54, 55, 56, 57, 58.

Figure 5:
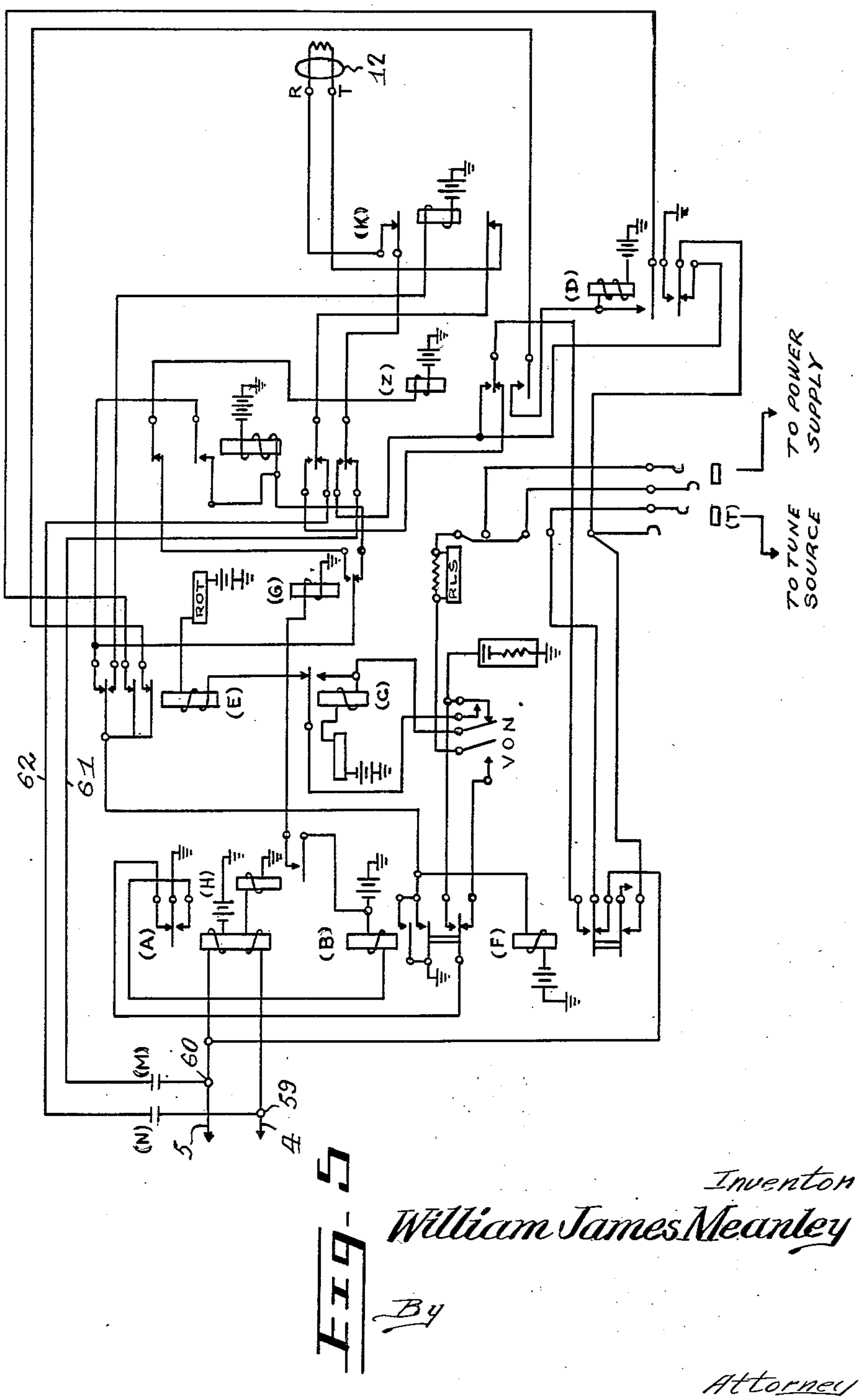
Fig. 5 illustrates a schematic circuit drawing of the connector switch employed in the invention.

In Fig. 5 there is shown a schematic circuit drawing of the selector switch 9 having pulsing relay A, pulse hold relay B, change over relay C to change the direction of the wipers 12 from a vertical to a rotary motion, signal tone reversal relay D, wiper rotating control relay E, signal tone removal relay F, tone condition relay G, holding relay H, busy test removal relay J, wiper cut-off relay K, tone removal relay Z, bridging capacitors M, N, vertical off normal switch VON, release magnet RLS, vertical and rotary magnets VERT and ROT respectively, tone jack (T) and battery jack BATT, terminals 59, 60, conductors 61, 62, and contact protection network NET.

In the operation of the system, the frame attendant at the telephone exchange selects a control pair 3 from the individual pairs of cable 1, connects this control pair 3 to terminals 59 and 60 of connector switch 9, connects signal tone device 15 to the (T) jack of connector switch 9 thereby impressing a signal tone on the ring conductor 5 of the control pair 3 through the break contacts of relay F, connects the remaining pairs of conductors 2 to contacts 7 on frame 6, attaches connecting shoe 8 to frame 6 so that contacts 22, 23 of shoe 8 are in engagement with contacts 7 on frame 6, connects one extremity of cable 14 to connecting shoe 8 through sockets 24, 25 and the other extremity of cable 14 to contacts 11 on bank 10 of connector switch 9, and connects energy source to the BATT jack of connector switch 9. The contacts 11 on bank 10 of connector switch 9 and the contacts of sockets 24, 25 on connecting shoe 8 are arranged in the same numerical sequence as the contacts 7 on frame 6.

The attendant, who is situated at the point where the end of the cable 1 is terminated remote from the telephone exchange, now probes the conductors of cable 1 in order to identify the conductor 5 on which signal tone has been impressed. Upon this identification, he connects this conductor 5 to the ring side of jack 36 of his control set 16 and the tip conductor 4 of the pair 3, which can readily be identified since the two conductors of a pair are associated with each other, to the tip side of jack 36, thereby establishing a completed communication circuit loop to wipers 12 of connector switch 9, the circuit being from tip side of jack 36, through contact 47 of dial 46, transmitter 49, receiver 50, contacts 41 and 39 of keys 40 and 38, respectively, ring side of jack 36, conductor 5, and at the telephone exchange terminal 60, capacitor M, conductor 61, break contacts relays J and K, ring side of wiper 12 and from tip side of wiper 12, break contacts at relays K and J, conductor 62, capacitor N, terminal 59, conductor 4, back to tip side of jack 36. There is also included in this circuit, pulsing relay A which actuates causing relays H, G, B and F to operate, relay B preparing a path for the vertical stepping of wipers 12, through relay C, and the vertical magnet VERT, relay F removing the signal tone from the ring conductor 5 of the control pair, relay G performing no function at this period of the operation. A dialing pulsing circuit loop is also established to the pulsing relay A, the circuit being from tip side of jack 36, contacts 47, 48 of dial 46, conductor 54, contacts 41 and 39 of keys 40 and 38, respectively, conductor 56, ring side of jack 36, conductor 5, relays A, H, conductor 4 back to tip side of jack 36.

After the attendants have exchanged instructions over the communication loop, the system is in a condition whereby the attendant at the remote end of the cable 1, as will be described hereinafter, can determine without assistance whether or not each pair is connected to energized terminals on the frame 6, the identification of each pair and the ring and tip conductors of each pair, for a predetermined series of pairs successively in a predetermined sequence. Consequently, any reference to the attendant hereinafter will refer only to the attendant at the remote end of cable 1.

The attendant, using control set 16, operates and then releases key 38 to break the dialing circuit loop, thereby ensuring that the selector switch 9 is in its starting position. Then he dials a code, such as 1—1. Relay A responds to the dialing impulses transmitted by the attendant so that the wipers 12 are stepped vertically through relay C and off normal springs VON. Relays B and C, having a slow to release characteristic do not restore on dial impulses. When dial 46 comes to rest at the end of the first digit, relay C restores transferring the vertical stepping circuit from relay C and the vertical magnet VERT to relay E and the rotary magnet ROT. When the dial 46 rotates back to normal on the second digit dialed, relay E and the rotary magnet ROT operate in series to step the wipers 12 around the bank 10 until they come into contact with the pair dialed. The operation of relay E permits relay K to operate, thus opening the tip and ring sides of wiper 12 during the rotary stepping to prevent any interference being transmitted over the contacts 11 on bank 10 of connector switch 9 as the wiper 12 passes these contacts. When the dialing impulses cease, relays E, K release. Relay Z operates at the beginning of the rotary period in turn operating relay D. However, the operation of these latter two relays has no useful function at this period of the operation.

At this point in the operation of the system, a monitoring circuit is established from the wipers 12 which have come to rest on the contacts to which the first conductor pair is connected over the communication circuit loop as described heretofore. Now the attendant may ascertain whether or not the terminals, to which the first conductor pair is attached, are in an energized condition at this period of the operation. Signal tone does not appear on the control pair 3 because relay F is actuated as described heretofore.

Having ascertained that the contacts 11, on which the wipers 12 have come to rest, are not in an energized condition, the attendant now proceeds to identify the first conductor pair by placing signal tone on the wipers 12 by actuating key 40 to ground the ring conductor 5 and to open the tip conductor 4. The grounding of the ring conductor 5 allows relay A to remain operated, and hence relays B, F are operated, relay J operates and is locked in this position by ground at relay B. while relay H releases and hence relays G, Z and D also release. Signal tone is therefore applied to the tip and ring wipers 12 through ring spring of jack T, make contacts of relay F, break contacts of relay Z, make contacts of relay J, break contacts of relay K to tip wiper 12 and from tip spring of jack T, break contacts of relay D, make contacts of relay J, break contacts of relay K to ring wiper. The attendant now actuates his key 43 to connect probe 17 across the receiver 50 and, by probing the conductors of cable 1, locates the pair on which the signal tone has been impressed.

The attendant may now determine which is the ring side of the first conductor pair as now identified by restoring key 38 to its original position which allows relay H to reoperate thus allowing relays G, Z and D to reoperate, relay D locking in its operated position to ground at relay B. Relay J as described above, is also locked in its operated position permitting signal tone to be applied to the ring wiper 12 from ring spring of jack T, make contacts of relay F, make contacts of relays Z and J, break contacts of relay K. The signal tone is grounded through the make contacts of relay D. By means of probe 17, the ring side of the pair may be determined.

The attendant now identifies the tip conductor of the first conductor pair by reoperating his key 40 which grounds the ring conductor 5 of the first conductor pair and opens the tip conductor 4 thereof, which action releases relays H, G and Z. Signal tone is now applied to tip wiper 12 from the ring spring of jack T, make contacts of relay F, break contacts of relay Z, make contact of relay J, break contacts of relay K to tip wiper 12. Signal tone is grounded through make contacts of relay D.

The wipers 12 may now be advanced to the next conductor pair, without the wipers 12 returning to their starting position, by dialing an additional digit in view of the fact that relay A remains operated during the tests described heretofore, the locked up paths of relays J and D being opened through the operation of relay E. Each pair of the cable 1 can therefore be identified in accordance with the procedure as described heretofore.

When the wipers 12 have reached the end of their travel on the first row of terminals 11 on bank 10, the attendant actuates his key 38, which action releases relays A and B, and provides a path for the release magnet RSL, thus tripping the switch to normal.

What is claimed is:

1. A system for identifying at the remote extremity of a cable, composed of a plurality of conductor pairs, the numerical arrangement of each pair at the other extremity thereof which comprises in combination: a two directional automatic telephone connector switch the wipers of which make successive individual contact step by step with a predetermined number of contacts on the terminal bank thereof during the rotary movement of the wipers without their return to their normal position between each step; an actuating means therefor; means for connecting a control pair of conductors to the actuating means and to the wipers; connecting means for connecting the conductor pairs to the terminal bank; means for applying a signal tone to the wipers; means attached to the remote extremity of the conductor pair adapted to control the actuating means, tone control means thereat for controlling the application of the signal to the wipers and means for identifying the conductor pair on which the signal tone has been applied.

2. A system for identifying at the remote extremity of a cable, composed of a plurality of conductor pairs, the numerical arrangement of each pair at the other extremity thereof which comprises in combination: a two directional automatic telephone connector switch the wipers of which make successive individual contact step by step with a predetermined number of contacts on the terminal bank thereof during the rotary movement of the wipers without their return to their normal position between each step; an actuating means therefor; means for connecting a control pair of conductors to the actuating means and to the wipers; connecting means for connecting the conductor pairs to the terminal bank; means for applying a signal tone to the wipers; means, including a listening means, attached to the remote extremity of the conductor pair adapted to control the actuating means, tone control means thereat for controlling the application of the signal to the wipers, and means, associated with the listening means, for identifying the conductor pair on which the signal tone has been applied.

3. A system in accordance with claim 2 in which said connecting means comprises: a panel having a plurality of terminals to which said conductor pairs are connected in a predetermined sequence; a connecting shoe having a plurality of contacts adapted to be clamped in yieldable contact with the terminals in the predetermined sequence; a multiconductor cable adapted to be connected to the contacts of the shoe and to the fixed contacts of the switching mechanism in the predetermined sequence.

4. A system for identifying at the remote extremity of a cable, composed of a plurality of conductor pairs, the numerical arrangement of each pair at the other extremity thereof which comprises in combination: a two directional automatic telephone connector switch the wipers of which make successive individual contact step by step with a predetermined number of contacts on the terminal bank thereof during the rotary movement of the wipers without their return to their normal position between each step; a pulsing means therefor; means for connecting a control pair of conductors to the actuating means and to the wipers; connecting means for connecting the conductor pairs to the terminal bank; means for applying a signal tone to the wipers; a control set disposed at the remote end of the cable which includes an impulsing means adapted to form with the extremity of the control pair thereat a closed circuit with the pulsing means, a listening means included in the circuit, a probing means adapted to receive a signal tone placed on a conductor pair under test, means for connecting the listening means thereto, a tone control means included in the circuit arranged to alter the electrical switching characteristics of the completed circuit whereby the tone is individually applied to the tip and ring, tip, ring of the wipers and to maintain therewith the actuation of the pulsing means for the predetermined number of contacts.

References Cited in the file of this patent

UNITED STATES PATENTS

| | | |
|---|---|---|
| 2,524,141 | Rosenblum | Oct. 3, 1950 |